US008674880B2

(12) United States Patent
Lecca et al.

(10) Patent No.: US 8,674,880 B2
(45) Date of Patent: Mar. 18, 2014

(54) METHOD OF DETERMINING THE DIRECTION OF ARRIVAL OF A HIGH-FREQUENCY ELECTROMAGNETIC WAVE

(75) Inventors: Arnaud Lecca, Colombes (FR); Eric Merlet, Colombes (FR); Jean-Christophe Mesnage, Colombes (FR); Jean-Luc Rogier, Colombes (FR)

(73) Assignee: Thales, Neuilly sur Siene (FR)

( * ) Notice: Subject to any disclaimer, the term of this patent is extended or adjusted under 35 U.S.C. 154(b) by 307 days.

(21) Appl. No.: 13/128,345

(22) PCT Filed: Nov. 4, 2009

(86) PCT No.: PCT/EP2009/064596
§ 371 (c)(1),
(2), (4) Date: Jul. 11, 2011

(87) PCT Pub. No.: WO2010/052234
PCT Pub. Date: May 14, 2010

(65) Prior Publication Data
US 2012/0086605 A1    Apr. 12, 2012

(30) Foreign Application Priority Data

Nov. 7, 2008    (FR) ........................................ 0806234

(51) Int. Cl.
*G01S 5/04*    (2006.01)
(52) U.S. Cl.
USPC ........................................................ 342/441
(58) Field of Classification Search
USPC ........................................................ 342/441
See application file for complete search history.

(56) References Cited

U.S. PATENT DOCUMENTS

| 3,735,401 | A | * | 5/1973 | Sakano et al. | 342/41 |
| 3,818,479 | A | * | 6/1974 | Ledbetter | 342/423 |
| 4,203,160 | A | * | 5/1980 | Doherty | 367/2 |
| 5,124,711 | A | * | 6/1992 | Sorais et al. | 342/361 |
| 5,973,643 | A | * | 10/1999 | Hawkes et al. | 342/457 |
| 6,300,905 | B1 | | 10/2001 | Chen et al. | |
| 2008/0012765 | A1 | | 1/2008 | Xu et al. | |

FOREIGN PATENT DOCUMENTS

JP    59125084 A  *  7/1984 ............. G01S 13/93

OTHER PUBLICATIONS

Schmidt R O: "Multiple Emitter Location and Signal Parameter Estimation" IEEE Transactions on Antennas and Propagation, IEEE Service Center, Piscataway, NJ, US, vol. AP-34, No. 3, Mar. 1, 1986, pp. 276-280, XP000644956 ISSN: 0018-926X, pp. 276-278.

(Continued)

*Primary Examiner* — Harry Liu
(74) *Attorney, Agent, or Firm* — Baker Hostetler LLP (57) ABSTRACT

A method of measuring the direction of arrival $\theta$ of radio signals in the HF band received by a crossed loop antenna includes, in a preparatory calibration phase, acquiring and recording the measurements made by the antenna of a calibration signal which varies in its frequency and bearing angle; and in a measurement phase in which the bearing angle or angles of arrival of signals detected by the antenna is or are determined, acquiring the signals detected in at least one frequency channel, and then, for each frequency channel $f_i$, correlating the acquired signals with the recordings having frequencies close to $f_i$, resulting from the calibration, and determining the direction of arrival of the signals by finding the bearing angle $\theta$ for which the maximum correlation is reached.

29 Claims, 4 Drawing Sheets

(56) References Cited

OTHER PUBLICATIONS

Biedka T E et al: "Direction finding methods for CDMA systems" Signals, Systems and Computers, 1996. Conference Record of the Thirtie Th Asilomar Conference on Pacific Grove, CA, USA Nov. 3-6, 1996, Los Alamitos, CA, USA, IEEE Comput. Soc, US, vol. 1, Nov. 3, 1996, pp. 637-641, XP010231506 ISBN: 978-0-8186-7646-8, p. 638.

* cited by examiner

|  | $\theta_1$ | ...... | $\theta_q$ | $\theta_{q+1}$ | ...... | $\theta_m$ |
|---|---|---|---|---|---|---|
| $f_1$ | $x_{1,1}$ | ...... | $x_{q,1}$ | $x_{q+1,1}$ | ...... | $x_{m,1}$ |
| $f_2$ | $x_{1,2}$ | ...... | $x_{q,2}$ | $x_{q+1,2}$ | ...... | $x_{m,2}$ |
| ⋮ | ⋮ | ⋮ | ⋮ | ⋮ | ⋮ | ⋮ |
| $f_i$ | $x_{1,i}$ | ...... | $x_{q,i}$ | $x_{q+1,i}$ | ...... | $x_{m,i}$ |
| $f_{i+1}$ | $x_{1,i+1}$ | ...... | $x_{q,i+1}$ | $x_{q+1,i+1}$ | ...... | $x_{m,i+1}$ |
| $f_{i+2}$ | $x_{1,i+2}$ | ...... | $x_{q,i+2}$ | $x_{q+1,i+2}$ | ...... | $x_{m,i+2}$ |
| ⋮ | ⋮ | ⋮ | ⋮ | ⋮ | ⋮ | ⋮ |
| $f_j$ | $x_{1,j}$ | ...... | $x_{q,j}$ | $x_{q+1,j}$ | ...... | $x_{m,j}$ |
| ⋮ | ⋮ | ⋮ | ⋮ | ⋮ | ⋮ | ⋮ |
| $f_n$ | $x_{1,n}$ | ...... | $x_{q,n}$ | $x_{q+1,n}$ | ...... | $x_{m,n}$ |

FIG.4

METHOD OF DETERMINING THE DIRECTION OF ARRIVAL OF A HIGH-FREQUENCY ELECTROMAGNETIC WAVE

CROSS-REFERENCE TO RELATED APPLICATIONS

This application is a National Stage of International patent application PCT/EP2009/064596, filed on Nov. 4, 2009, which claims priority to foreign French patent application No. FR 08 06234, filed on Nov. 7, 2008, the disclosures of which are incorporated by reference in their entirety.

FIELD OF THE INVENTION

The present invention relates to a method of determining the direction of arrival of a high-frequency electromagnetic wave, in other words a wave in the HF band. It is applicable, notably, to the detection of electromagnetic signal transmitters at short and medium distances of the order of several hundred kilometers or less, more particularly in the maritime field.

BACKGROUND OF THE INVENTION

In order to determine the direction of arrival of an electromagnetic signal, it is desirable for the antenna used to capture the signal to be large with respect to the wavelength of the signal. For example, in the case of an HF signal, the size of the antenna should theoretically be as much as several hundred meters. Thus, if the direction of arrival of the signal is measured from a platform of limited size such as a ship or a naval base, the antenna which is used generally has a special geometry enabling its dimensions to be reduced. In most cases, the antenna includes a monopole and two crossed loops, this type of antenna being commonly known as a "Watson-Watt antenna", owing to the eponymous algorithm which is conventionally used to determine the bearing angle of an incident signal.

However, when operating from either a land- or sea-based platform, if it is desired to determine the direction of arrival of an electromagnetic signal emitted by a remote transmitter placed at ground level, in other words if it is desired to determine the bearing angle of arrival of a signal having a zero or quasi-zero elevation angle, the measurements are sometimes biased by the detection of waves having non-zero elevation angles and non-vertical polarization. This is because, in some cases, some waves captured by the antenna are initially emitted from the ground but are then reflected by the ionosphere which modifies their polarization. Incorrect values will then be obtained for the bearings if the Watson-Watt algorithm is used.

Furthermore, measurements of the direction of arrival of a signal are sometimes disturbed by the presence, in the proximity of the antenna, of physical structures which create reflections and parasitic coupling. This is the case, for example, on a ship, whose structure and external elements modify the electromagnetic environment around the antenna.

Finally, the known techniques cannot be used to estimate the quality of a bearing angle measurement which is obtained. It is thus impossible to distinguish reliable measurements from erroneous measurements.

SUMMARY OF THE INVENTION

One object of the invention is to determine, from a platform of limited size, the direction of arrival of an electromagnetic wave in an electromagnetic environment subject to parasitic reflections. For this purpose, the invention proposes a method of measuring the angle of arrival θ of HF band radio signals received by a crossed loop antenna or an Adcock antenna array, the method comprising:
  in a preparatory calibration phase, acquiring and recording the measurements made by the antenna of a calibration signal which varies in its bearing and has a fixed or variable frequency;
  in a phase of measuring detected signals:
    acquiring the detected signals in at least one frequency channel;
    for each frequency channel $f_i$, correlating the acquired signals with the recorded signals resulting from the frequency calibration close to $f_i$, and determining the direction of arrival of the signals by finding the bearing angle θ for which the maximum correlation is obtained.

The electromagnetic environment of the antenna in the calibration phase must be similar to that which is present in the measurement phase. Thus the method enables allowance to be made in a natural way during the measurement phase for the specific features of the electromagnetic environment around the antenna, such as the features due to the presence of disturbing elements in the proximity of the antenna.

In one embodiment of the angle measurement method according to the invention, each acquisition in the calibration phase is recorded in a table in the form of an intercorrelation vector, the vectors in this table being subsequently correlated with another intercorrelation vector obtained from the signals acquired in the measurement phase, each of the intercorrelation vectors being calculated by executing at least the following steps:
  acquiring, at least on the sine loop and the cosine loop of the antenna, N signal measurements, where N≥1, over a time interval Δt;
  for p measurements out of the N measurements made previously, calculating an elementary intercorrelation vector $X_k$;
  calculating a mean intercorrelation vector X by finding the mean of the p elementary intercorrelation vectors $X_k$ calculated previously.

By finding the mean of a plurality of elementary intercorrelation vectors it is possible, notably, to reduce the effect of noise on the estimation of the acquired signals. Additionally, the intercorrelation vector X can be normalized.

In one embodiment of the angle measurement method according to the invention, an elementary intercorrelation vector $X_k$ obtained from a signal measurement k is defined thus:

$$X_k = \frac{1}{\|X_{0,k}\|^2} \cdot \begin{pmatrix} X_{0,k} \cdot X_{0,k}^H \\ X_{0,k} \cdot X_{c,k}^H \\ X_{0,k} \cdot X_{s,k}^H \end{pmatrix},$$

where $X_{0,k}$ is the complex measurement acquired on the monopole, $X_{c,k}$ is the complex measurement acquired on the cosine frame, $X_{s,k}$ is the complex measurement acquired on the sine frame, and $^H$ is the Hermitian operator.

In one embodiment of the angle measurement method according to the invention, the correlation criterion increases with the modulus of the scalar product of the intercorrelation vector of the detected signals and the intercorrelation vector of the signals acquired in the calibration phase. The correlation criterion can be, for example, equal to $|X_{norm} \cdot T(f,\theta_k)|^2$, where $X_{norm}$ is a normalized intercorrelation vector calculated from the detections which have been executed during the measurement phase, $T(f,\theta_k)$ is an intercorrelation vector calculated from the detections executed in the calibration phase for a calibration signal having a frequency f and a bearing angle of arrival $\theta_k$, and "·" represents the complex scalar product.

The angle measurement method according to the invention can comprise a step estimating the quality of a bearing measurement θ, a quality score Q being assigned to this measurement as a function of the level of the maximum correlation obtained, this score Q being an increasing monotonic function of the maximum correlation. An example of an objective, reliable criterion for evaluating the quality of a measurement is the level of the peak correlation achieved in the correlation step.

The angle measurement method according to the invention can comprise a step of identifying erroneous measurements, a minimum correlation threshold being chosen and a comparison being made between this threshold and the quality score Q assigned to a measurement to identify a measurement whose quality score Q is below the threshold, a measurement of this type being taken to mean that the measurement of the bearing angle of arrival θ is probably erroneous.

In one embodiment of the angle measurement method according to the invention, the antenna is fixed on a ship, the calibration phase being executed by transmitting signals from a fixed transmitter positioned substantially at sea level, in such a way that the transmitted signals are received by the antenna at an elevation angle of practically zero, the ship moving at a distance from the transmitter and its course being changed to vary the bearing angles of arrival of the signal with respect to the antenna.

In one embodiment of the angle measurement method according to the invention, in the calibration phase the calibration signal is transmitted in such a way that the elevation angle of arrival of the signal at the crossed loop antenna is substantially constant.

The invention also proposes a monitoring method used on a platform at sea or on land, the method including at least the following steps:
  at an angle of elevation substantially equal to zero, defining a range of bearing directions $[\theta_i; \theta_j]$ to be monitored;
  if signals are detected, executing the steps of the method of measuring the direction of arrival as described above;
  if a signal is detected in the monitored range, triggering an alert command.

The invention also proposes a goniometer using the measurement method as described above.

The invention also proposes a monitoring system installed on a ship and using the monitoring method as described above.

BRIEF DESCRIPTION OF THE DRAWINGS

Other characteristics will be made clear by the following detailed description, given by way of non-limiting example with reference to the appended drawings, in which.

To increase the clarity of the description, the same references in different figures indicate the same elements.

DETAILED DESCRIPTION

Figure 1A:
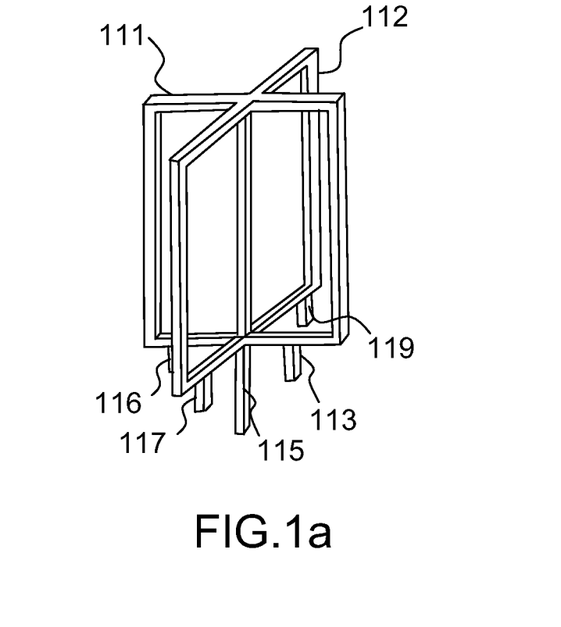
FIGS. 1a and 1b show a perspective view and a top view of a first example of a crossed loop antenna receiving the signals processed by the angle measurement method according to the invention.
Figure 1B:
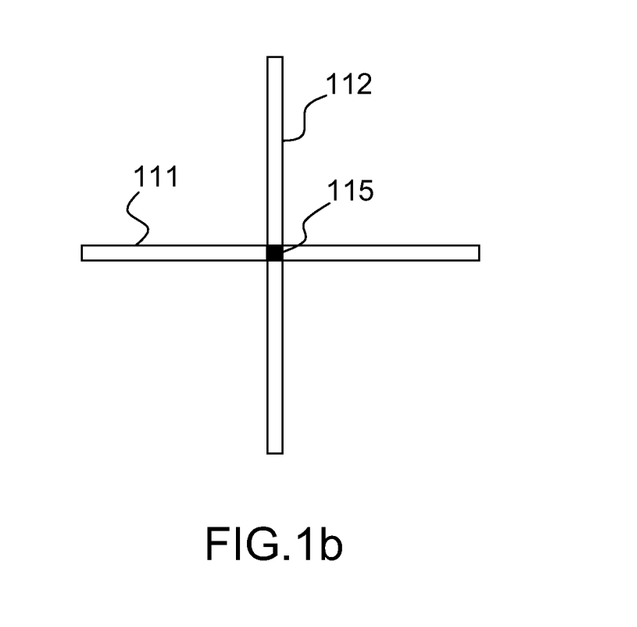

FIGS. 1a and 1b show a first example of a crossed loop antenna receiving the signals processed by the angle measurement method according to the invention. FIG. 1a is a perspective view of the antenna, while FIG. 1b shows the antenna viewed from above.

The antenna 100 includes a first loop 111 orthogonal to a second loop 112, the two loops 111 and 112 in this example being formed by metal rectangles held by a support 115 and lying in substantially vertical planes. The first loop 111 is sometimes known as the "sine loop", the second loop 112 being known as the "cosine loop". The antenna 100 in this example includes a third reception channel in the form of a monopole formed by vertical metal rods 116, 117, 118, 119 placed under the loops 111, 112.

Figure 2A:
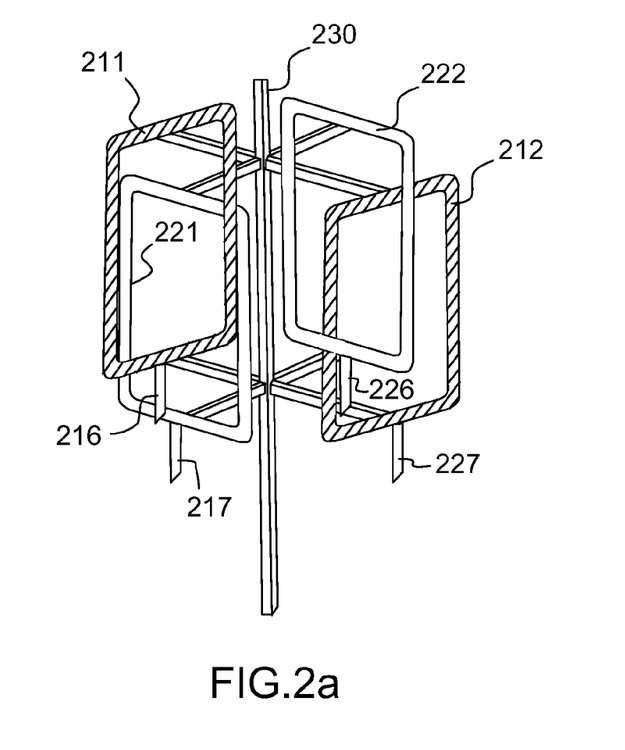
FIGS. 2a and 2b show a perspective view and a top view of a second example of a crossed loop antenna receiving the signals processed by the angle measurement method according to the invention.
Figure 2B:
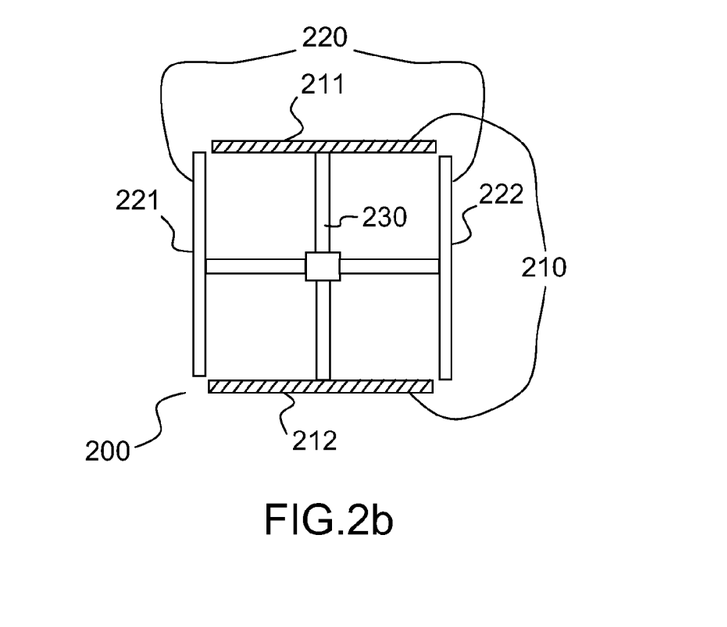

FIGS. 2a and 2b show a second example of a crossed loop antenna receiving the signals processed by the angle measurement method according to the invention. FIG. 2a is a perspective view of the antenna, while FIG. 2b shows the antenna viewed from above.

The antenna 200 includes two pairs 210, 220 of loops held by a support 230, the loops of each pair 210, 220 being parallel to each other, the loops 211, 212 of the first pair 210 being orthogonal to the loops 221, 222 of the second pair 220, and all the loops 211, 212, 221, 222 of the antenna being, in this example, metal rectangles lying in substantially vertical planes. In the example, the pairs of loops 210, 220 are held around the support 230 in such a way that they substantially form a square when viewed from above. In the example, the antenna also includes a substantially vertical metal rod 216, 217, 226, 227 under each loop 211, 212, 221, 222, the set of these rods 216, 217, 226, 227 forming the monopole channel of the antenna. From a theoretical viewpoint, this antenna is equivalent to the antenna shown in FIGS. 1a and 1b. The terms "sine loop" and "cosine loop" will be used henceforth to refer to the first type of antenna shown in FIGS. 1a and 1b, these terms being applied to the pairs 210, 220 of loops 211, 212, 221, 222 when the method is used with the second type of antenna shown in FIGS. 2a and 2b.

In another embodiment of the method according to the invention, the crossed loop antenna is replaced by an Adcock antenna array, which can be modeled in a similar way to crossed loop antennas, in other words by at least a sine loop and a cosine loop.

The monopole of the antenna can also be replaced with a dipole or any other antenna serving as a reference channel.

Figure 3:
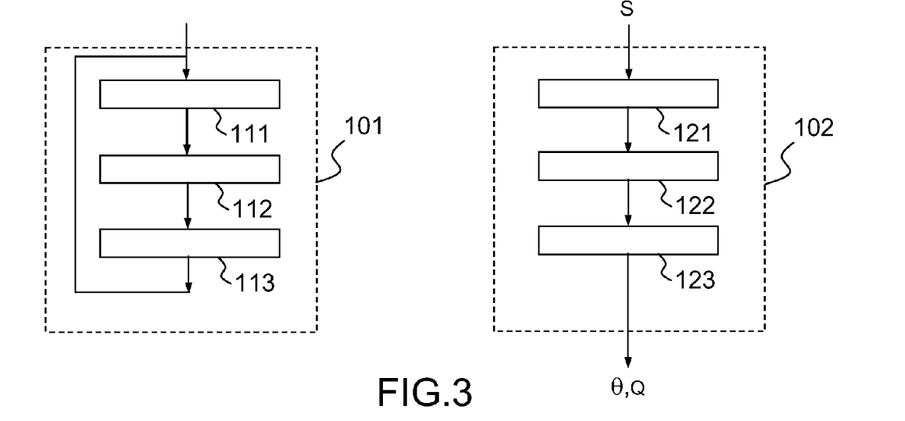
FIG. 3 is a synoptic diagram showing the steps of an angle measurement method according to the invention.

FIG. 3 is a synoptic diagram showing the steps of an angle measurement method according to the invention.

The steps of the method are divided into two phases 101 and 102. The first phase 101 is a preparatory phase of antenna calibration, and the second phase 102 is a measurement phase having the purpose of measuring the direction of arrival of a signal received by the antenna. In the example, the crossed loop antenna comprises two orthogonal loops and a monopole.

The first calibration phase 101 is executed in the conditions of the end use of the antenna. For example, if physical structures are present in the proximity of the antenna in normal conditions, the calibration is carried out in the presence of these structures, which can modify the antenna response by creating distinctive electromagnetic couplings. Electromagnetic calibration signals are transmitted toward the antenna while their transmission frequency and their angle of arrival are varied. A calibration table can then be constructed by recording the responses of the antenna to signals varying in their frequencies and bearings.

For example, a fixed transmitter is placed at a distance from a ship having a crossed loop antenna. The transmitter is operated so as to transmit signals by sweeping a frequency band to be calibrated, and the ship is then moved in order to vary the bearing angle of arrival of the signals at the antenna. The antenna must not be moved with respect to the ship during the calibration phase 101, as this would falsify the electromagnetic conditions of reception. Additionally, the elevation angle of arrival of the signals at the receiving antenna is chosen to correspond to the cases of application of the angle measurement method according to the invention. For example, if the method is used by ships to determine the direction of arrival of signals transmitted by other ships, the elevation angle chosen for the calibration will be zero or practically zero.

Additionally, in special cases of use, the frequency of the calibration signal is kept fixed, notably if it is only desired to detect specific signals whose frequency is known in advance.

More precisely, the calibration phase 101 of FIG. 3 includes a first step 111 of signal acquisition and detection, a second step 112 of calculation of an acquisition vector corresponding to the transmitted signals, and a third step 113 of storage of the acquisition vector in the calibration table. In the example, these three steps 111, 112 and 113 are executed for a fixed bearing angle and for transmission frequencies varying in the high frequency range, after which these steps 111, 112 and 113 are reiterated with different bearing angles, until all the desired bearing angles have been covered.

In the first step 111, acquisition frequencies are chosen from the signal transmission frequencies. For each chosen acquisition frequency F, the signal with the frequency F received by the crossed loop antenna is then acquired in three channels: namely a monopole channel $X_0$, a channel corresponding to the first loop $X_c$ of the antenna, sometimes known as the "cosine loop", and a channel corresponding to the second loop $X_s$ of the antenna, sometimes called the "sine loop". Preferably, a plurality of signal measurements are acquired in succession in these three channels $X_0$, $X_c$, $X_s$, this first step 111 of signal acquisition then being executed, preferably, over a time interval $\Delta t_{cal}$ which is long enough for the acquisition of a series of measurements, but short enough for the bearing angle of arrival of the signals to remain practically unchanged during the series of measurements if the antenna is moving with respect to the signal transmitter. Thus, at the end of the first step 111, N acquisitions $X_{0,1}, \ldots, X_{0,N}$ on the monopole channel, N acquisitions $X_{c,1}, \ldots, X_{c,N}$ on the cosine channel and N acquisitions $X_{s,1}, \ldots, X_{s,N}$ on the sine channel have been completed for each acquisition frequency F.

In the second step 112, an intercorrelation vector X between the three channels, referred to a reference channel, is calculated for each acquisition frequency F. For an observation k, $1 \leq k \leq N$, the elementary intercorrelation vector $X_k$ corresponding to the acquisitions of the observation k is determined as follows:

$$X_k = \frac{1}{\|X_{0,k}\|^2} \cdot \begin{pmatrix} X_{0,k} \cdot X_{0,k}^H \\ X_{0,k} \cdot X_{c,k}^H \\ X_{0,k} \cdot X_{s,k}^H \end{pmatrix}$$

where $X_{0,k}$ is the complex measurement acquired on the monopole, $X_{c,k}$ is the complex measurement acquired on the cosine frame, $X_{s,k}$ is the complex measurement acquired on the sine frame, and $^H$ is the Hermitian operator. The reference channel chosen in the example is the channel corresponding to the monopole. In other applications of the angle measurement method according to the invention, the chosen reference channel is that of the sine loop or the cosine loop.

In the example, the intercorrelation vector X is calculated by finding the mean of the measurements acquired in a number s of observations, where $s \leq N$, so as to limit the effect of noise on the intercorrelation vector X:

$$X = \frac{1}{s} \sum_{k=1}^{s} X_k$$

Additionally, the intercorrelation vector X is preferably normalized to 1:

$$X_{norm} = \frac{X}{\|X\|}$$

In the third step 113, the data characterizing the acquired signals are stored in the calibration table for each acquisition frequency F. In the example, these characterizing data are stored in the form of normalized intercorrelation vectors $X_{norm}$, calculated previously for each acquisition frequency F. The calibration table is thus populated with the normalized intercorrelation vectors formed from detections and acquisitions of signals having different frequencies.

The first step 111, the second step 112 and the third step 113 are reiterated successively for different angles of arrival, in such a way that, at the end of the calibration phase 101, p normalized intercorrelation vectors $X_{norm}(\theta_1), \ldots, X_{norm}(\theta_p)$ are stored for each acquisition frequency, each of the vectors corresponding to a signal received with a different bearing angle of arrival $\theta_1, \ldots, \theta_p$. For this reason, an intercorrelation vector stored in the calibration is subsequently described as a "directional vector".

Figure 4:
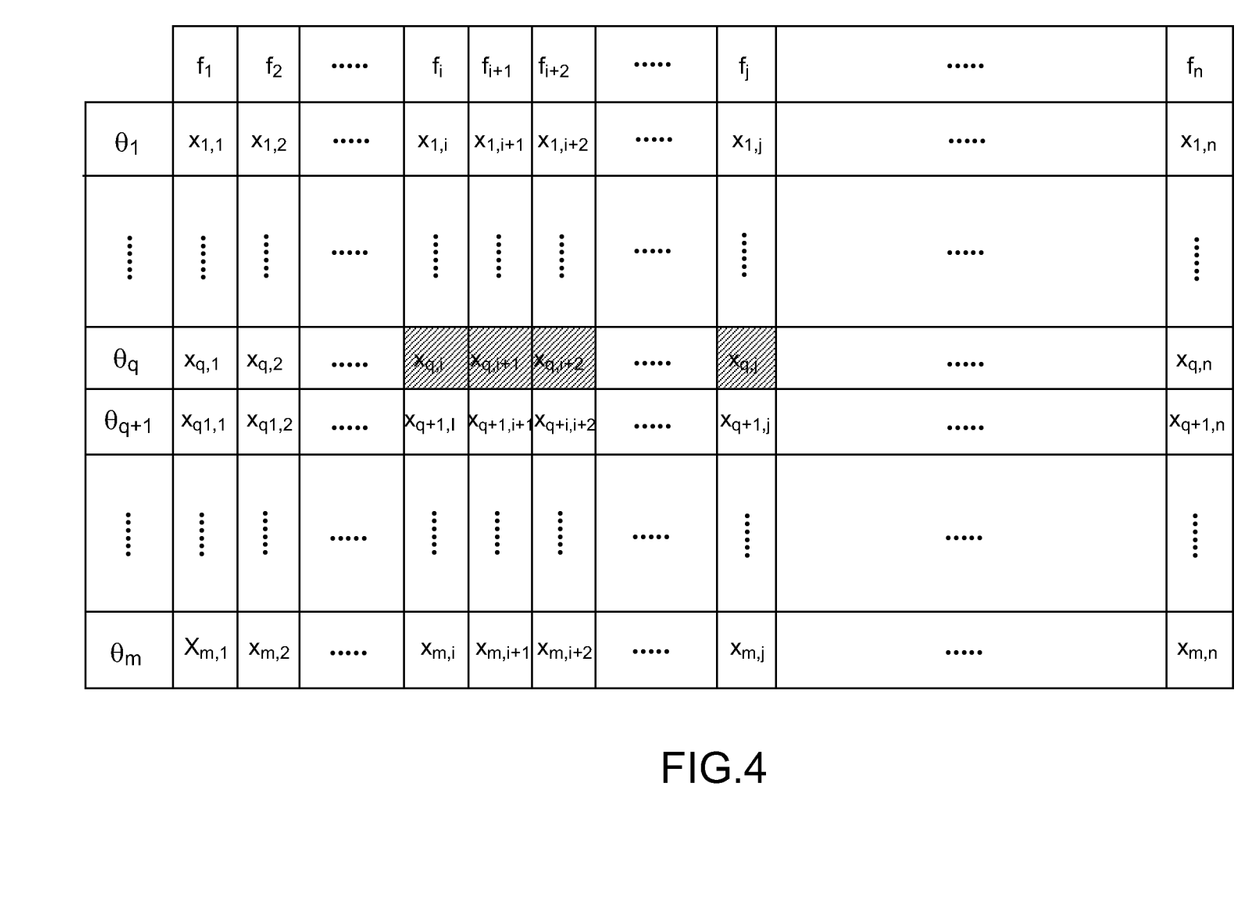
FIG. 4 shows a calibration table used for the execution of an angle measurement method according to the invention.

FIG. 4 shows a calibration table which records acquisition vectors in a frequency band $[f_i; f_n]$ and for bearing angles varying from $\theta_1$ to $\theta_m$.

In another embodiment of the calibration phase 101, the first step 111, the second step 112 and the third step 113 are carried out for a fixed frequency and for varying bearing angles. The steps 111, 112, 113 are then reiterated while the transmission frequency is modified. For example, a mobile transmitter is moved around the antenna and the transmitter modifies its transmission frequency after the completion of a full revolution, in such a way that, after q revolutions, q different frequencies are calibrated.

When the calibration phase 101 has been completed, one or more measurement phases 102 can be carried out. A measurement phase 102 enables the direction of arrival of a detected signal to be determined. The measurement phase 102 of FIG. 3 includes a first signal detection and acquisition step 121, a second acquisition vector calculation step 122, and a third step 123 of correlation between the acquisition vector and vectors resulting from the calibration.

In the first step 121, the received signal is acquired over a time interval Δt and is divided into a plurality of frequency channels. At the end of the first step 121, one or more acquisitions of the signal is/are carried out for each frequency channel, preferably over the three channels of the antenna.

In the second step 122, an intercorrelation vector is calculated from the acquisitions carried out in the first step 121. The intercorrelation vector is calculated according to the same method as that described previously for the second step 112 of the calibration phase. At the end of this second step 122, an acquisition vector $X_{norm}$, formed on the basis of the signals acquired by the antenna, is obtained for each frequency channel to be analyzed.

In the third step 123, vector correlation calculations are carried out to determine the direction of arrival of the signals received by the antenna. In the example, the correlation criterion used is the squared modulus of the complex scalar product of acquisition vectors. Thus, for each frequency channel analyzed, the directional vectors which correspond to different bearing angles and to a frequency close to this frequency channel and which are recorded in the calibration table are identified, following which the squared modulus of the complex scalar products of the acquisition vector $X_{norm}$ formed from the signal acquired by the antenna on this frequency channel and each of the identified directional vectors is calculated. For each frequency channel, the maximum of this modulus is found, the directional vector of the calibration table enabling this maximum to be determined as the maximum corresponding to the angle of arrival of the received signal, as shown by the following expression:

$$Q(f) = \underset{k}{\operatorname{argmax}}(|X_{norm} \cdot T(f, \theta_k)|^2)$$

where f, in this example, is the central frequency of the frequency channel used, $X_{norm}$ is the acquisition vector of the signal whose direction of arrival is to be determined, and $T(f,\theta_k)$ is a directional vector recorded in the calibration table and corresponding to a frequency signal f reaching the antenna with a bearing angle θ.

At the end of the measurement phase 102, a bearing angle measurement θ is found for each frequency channel analyzed. Additionally, a quality score Q is associated with each bearing angle measurement θ that is found, this score being related to the level reached by the correlation criterion. A maximum score is obtained when the vectors $X_{norm}$ and T(f, θ) are colinear, while a lower score is obtained when the angle formed between the vectors $X_{norm}$ and T(f,θ) increases. In the example, Q is given by the following relation:

$$\theta(f) = \underset{k}{\max}(|X_{norm} \cdot T(f, \theta_k)|^2)$$

where "·" represents the complex scalar product.

A number of different bearing angles can be determined, for example if a plurality of transmitters in different directions transmit signals simultaneously.

In one embodiment of the measurement method according to the invention, a more precise bearing angle of arrival θ can be obtained by calculating an interpolated value based on a number of bearing values $\theta_i$ around the maximum correlation. For example, a quadratic interpolation can be carried out on the basis of the three values around the determined maximum.

Figure 6:
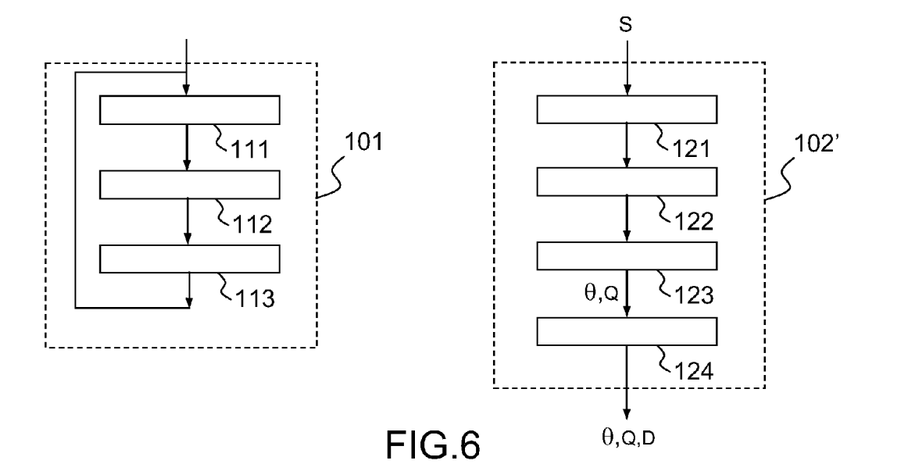
FIG. 6 is a synoptic diagram showing the steps of a second use of the angle measurement method according to the invention.

In the example of FIG. 6, in the measurement phase 102, signals are detected by the antenna over a frequency band extending from $f_i$ to $f_j$, where 1≤i≤j≤n. For a number of frequencies in the range [$f_i$; $f_j$], correlation calculations are carried out and pairs (frequency, bearing angle) are identified by finding the maximum correlation. These pairs are shown by hatching in FIG. 6, which shows that all the detected signals arrive with the same bearing angle of $\theta_q$, 1≤q≤m.

Figure 5:
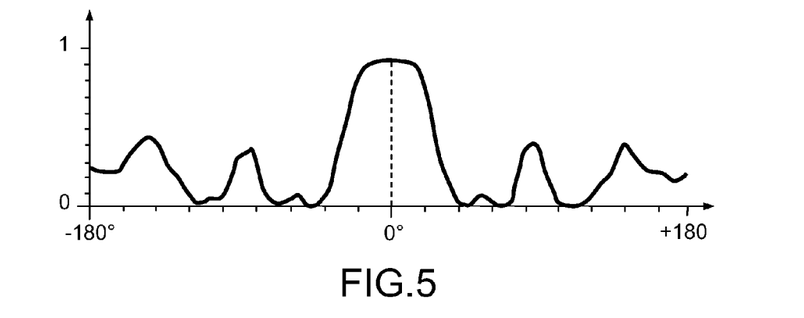
FIG. 5 is a graph showing a correlation curve produced by the execution of an angle measurement method according to the invention.

FIG. 5 is a graph showing an example of a correlation curve found by applying an angle measurement method according to the invention. The correlation criterion varying from 0 to 1 is shown on the vertical axis, and the bearing angle is shown on the horizontal axis. In the example of FIG. 5, the direction of arrival of the signal is 0°, because the maximum correlation is found for this angle.

FIG. 6 is a synoptic diagram showing the steps of a second use of the angle measurement method according to the invention. This differs from the method shown in FIG. 3 in that a supplementary test step 124 is added in the measurement phase 102'. As described above, the measurement of the bearing angle of arrival θ of the signal is considered to improve as the correlation criterion increases. Thus this test step 124 invalidates the measurement of the bearing angle of arrival if the correlation criterion is below a previously chosen threshold. In the example, an indicator D is generated by the test step 124. When the criterion is below the threshold, the indicator D is set to 0; otherwise the indicator D is set to 1. Thus, values having low reliability can be identified and immediately rejected, without any risk of leading the user into error.

One advantage of the angle measurement method according to the invention is the simplicity of its application. When the calibration phase has been completed, a simple calculator can be used to carry out the correlation calculations, any parasitic electromagnetic coupling being allowed for implicitly in the calculations. This is because the angle measurement method according to the invention is not applied to a theoretical model only, but allows for the real response of the antenna measured in its environmental context.

Another advantage of the angle measurement method according to the invention is that it permits the automatic reduction of the effect of incident signals whose angle of elevation does not correspond to the angle of elevation chosen for the calibration. For example, if ionospheric waves are received by the antenna, the signals carried by these waves are naturally excluded by the vector correlation step 123, since the correlation executed on these signals does not match the model recorded in the calibration table. This advantage can be used, for example, in the case of a ground- or sea-based monitoring system for detecting radio transmissions originating solely from a transmitter located at ground level. In this case, only transmissions with angles of elevation equal to zero or practically zero will be correctly correlated.

The invention claimed is:

1. A method of measuring a bearing angle of arrival θ of HF band radio signals received by a crossed loop antenna or an Adcock antenna array, the method comprising:
   in a preparatory calibration phase, acquiring and recording measurements, made by an antenna, of a calibration signal which has a variable bearing angle of arrival θ and has a fixed or variable frequency; and in a detected signals measurement phase:
acquiring detected signals in at least one frequency channel; and
for each frequency channel $f_i$, correlating the acquired detected signals with the recorded calibration signals resulting from a frequency calibration of approximately $f_i$, and determining, using a processor, the direction of arrival of the detected signals by finding the bearing angle of arrival $\theta$ having the maximum correlation value.

2. The method according to claim 1, wherein each acquisition in the preparatory calibration phase is recorded in a table in the form of an intercorrelation vector, the intercorrelation vectors in the table being correlated with another intercorrelation vector obtained from the detected signals acquired in the detected signals measurement phase, the method further comprising calculating each of the intercorrelation vectors by:
acquiring, on a sine loop and a cosine loop of the antenna, N signal measurements, where $N \geq 1$, over a time interval $\Delta t$;
calculating, for p measurements out of the N measurements, an elementary intercorrelation vector $X_k$; and
calculating a mean intercorrelation vector X by determining a mean of the p elementary intercorrelation vectors $X_k$.

3. The method according to claim 2, wherein the elementary intercorrelation vector $X_k$ based on a measurement k is defined as:

$$X_k = \frac{1}{\|X_{0,k}\|^2} \cdot \begin{pmatrix} X_{0,k} \cdot X_{0,k}^H \\ X_{0,k} \cdot X_{c,k}^H \\ X_{0,k} \cdot X_{s,k}^H \end{pmatrix},$$

where $X_{0,k}$ is a complex measurement acquired on a monopole, $X_{c,k}$ is a complex measurement acquired on a cosine frame, $X_{s,k}$ is a complex measurement acquired on a sine frame, and $^H$ is the Hermitian operator.

4. The method according to claim 2, wherein a correlation criterion increases with a modulus of a scalar product of the intercorrelation vector of the detected signals and the intercorrelation vector of the calibration signals acquired during the preparatory calibration phase.

5. The method according to claim 1, further comprising:
estimating the quality of a bearing angle of arrival $\theta$ measurement, a quality score Q being assigned to the bearing angle of arrival $\theta$ measurement as a function of a level of the maximum correlation value, the quality score Q being an increasing monotonic function of the maximum correlation value.

6. The method according to claim 5, further comprising:
identifying erroneous measurements by receiving a minimum threshold and comparing the minimum threshold and the quality score Q assigned to the bearing angle of arrival $\theta$ measurement to identify a bearing angle of arrival $\theta$ measurement having a quality score Q below the minimum threshold.

7. The method according to claim 1, wherein the antenna is fixed on a ship, and the preparatory calibration phase is executed by transmitting signals from a fixed transmitter positioned substantially at sea level, so that the transmitted signals are received by the antenna at an elevation angle of substantially zero, the ship moving at a distance from the transmitter and the course of the ship being changed to vary the bearing angles of arrival $\theta$ of the calibration signal with respect to the antenna.

8. The method according to claim 1, wherein, in the preparatory calibration phase, the calibration signal is transmitted so that an angle of elevation of arrival of the calibration signal at the crossed loop antenna is substantially constant.

9. A method of monitoring used on a platform at sea or on the ground, the method comprising:
defining, at an angle of elevation substantially equal to zero, a range of bearing angles to be monitored;
if the radio signals are detected, executing the method of measuring the bearing angle of arrival $\theta$ of the radio signals according to claim 1; and
if a radio signal is detected in the monitored range of bearing angles, triggering an alert command.

10. A goniometer configured to execute the method of measuring the bearing angle of arrival $\theta$ according to claim 1.

11. A monitoring system positioned on a ship, the monitoring system configured to execute the method of monitoring according to claim 9.

12. The method according to claim 1, wherein each acquisition in the preparatory calibration phase is made by acquiring, on a sine loop and a cosine loop of the antenna, N signal measurements, where $N \geq 1$, over a time interval $\Delta t$.

13. A method of measuring a bearing angle of arrival $\theta$ of HF band radio signals received by a crossed loop antenna or an Adcock antenna array, the method comprising:
in a preparatory calibration phase, acquiring and recording measurements, made by an antenna, of a calibration signal which has a variable bearing angle of arrival $\theta$ and has a fixed or variable frequency; and
in a detected signals measurement phase:
acquiring detected signals in at least one frequency channel; and
for each frequency channel $f_i$, correlating the acquired detected signals with the recorded calibration signals resulting from a frequency calibration of approximately $f_i$, and determining, using a processor, the direction of arrival of the detected signals by finding the bearing angle of arrival $\theta$ having the maximum correlation value,
wherein each acquisition in the preparatory calibration phase is recorded in a table in the form of an intercorrelation vector, the intercorrelation vectors in the table being correlated with another intercorrelation vector obtained from the detected signals acquired in the detected signals measurement phase,
the method further comprising calculating each of the intercorrelation vectors by:
acquiring, on a sine loop and a cosine loop of the antenna, N signal measurements, where $N \geq 1$, over a time interval $\Delta t$;
calculating, for p measurements out of the N measurements, an elementary intercorrelation vector $X_k$; and
calculating a mean intercorrelation vector X by determining a mean of the p elementary intercorrelation vectors $X_k$.

14. The method according to claim 13, further comprising:
estimating the quality of a bearing angle of arrival $\theta$ measurement, a quality score Q being assigned to the bearing angle of arrival $\theta$ measurement as a function of a level of the maximum correlation value, the quality score Q being an increasing monotonic function of the maximum correlation value.

15. The method according to claim 14, further comprising:
identifying erroneous measurements by receiving a minimum threshold and comparing the minimum threshold and the quality score Q assigned to the bearing angle of arrival θ measurement to identify a bearing angle of arrival θ measurement having a quality score Q below the minimum threshold.

16. The method according to claim 13, wherein the antenna is fixed on a ship, and the preparatory calibration phase is executed by transmitting signals from a fixed transmitter positioned substantially at sea level, so that the transmitted signals are received by the antenna at an elevation angle of substantially zero, the ship moving at a distance from the transmitter and the course of the ship being changed to vary the bearing angles of arrival θ of the calibration signal with respect to the antenna.

17. The method according to claim 13, wherein, in the preparatory calibration phase, the calibration signal is transmitted so that an angle of elevation of arrival of the calibration signal at the crossed loop antenna is substantially constant.

18. A method of monitoring used on a platform at sea or on the ground, the method comprising:
defining, at an angle of elevation substantially equal to zero, a range of bearing angles to be monitored;
if the radio signals are detected, executing the method of measuring the bearing angle of arrival θ of the radio signals according to claim 13; and
if a radio signal is detected in the monitored range of bearing angles, triggering an alert command.

19. A goniometer configured to execute the method of measuring the bearing angle of arrival θ according to claim 13.

20. A monitoring system positioned on a ship, the monitoring system configured to execute the method of monitoring according to claim 18.

21. A method of measuring a bearing angle of arrival θ of HF band radio signals received by a crossed loop antenna or an Adcock antenna array, the method comprising:
in a preparatory calibration phase, acquiring and recording measurements, made by an antenna, of a calibration signal which has a variable bearing angle of arrival θ and has a fixed or variable frequency;
in a detected signals measurement phase:
acquiring detected signals in at least one frequency channel, and
for each frequency channel $f_i$, correlating the acquired detected signals with the recorded calibration signals resulting from a frequency calibration of approximately $f_i$, and determining, using a processor, the direction of arrival of the detected signals by finding the bearing angle of arrival θ having the maximum correlation value; and
estimating the quality of a bearing angle of arrival θ measurement, a quality score Q being assigned to the bearing angle of arrival θ measurement as a function of a level of the maximum correlation value, the quality score Q being an increasing monotonic function of the maximum correlation value.

22. The method according to claim 21, wherein each acquisition in the preparatory calibration phase is recorded in a table in the form of an intercorrelation vector, the intercorrelation vectors in the table being correlated with another intercorrelation vector obtained from the detected signals acquired in the detected signals measurement phase, the method further comprising calculating each of the intercorrelation vectors by:
acquiring, on a sine loop and a cosine loop of the antenna, N signal measurements, where N≥1, over a time interval Δt;
calculating, for p measurements out of the N measurements, an elementary intercorrelation vector $X_k$; and
calculating a mean intercorrelation vector X by determining a mean of the p elementary intercorrelation vectors $X_k$.

23. The method according to claim 22, wherein the elementary intercorrelation vector $X_k$ based on a measurement k is defined as:

$$X_k = \frac{1}{\|X_{0,k}\|^2} \cdot \begin{pmatrix} X_{0,k} \cdot X_{0,k}^H \\ X_{0,k} \cdot X_{c,k}^H \\ X_{0,k} \cdot X_{s,k}^H \end{pmatrix},$$

where $X_{0,k}$ is a complex measurement acquired on a monopole, $X_{c,k}$ is a complex measurement acquired on a cosine frame, $X_{s,k}$ is a complex measurement acquired on a sine frame, and $^H$ is a Hermitian operator.

24. The method according to claim 22, wherein a correlation criterion increases with a modulus of a scalar product of the intercorrelation vector of the detected signals and the intercorrelation vector of the calibration signals acquired during the preparatory calibration phase.

25. The method according to claim 21, wherein the antenna is fixed on a ship, and the preparatory calibration phase is executed by transmitting signals from a fixed transmitter positioned substantially at sea level, so that the transmitted signals are received by the antenna at an elevation angle of substantially zero, the ship moving at a distance from the transmitter and the course of the ship being changed to vary the bearing angles of arrival θ of the calibration signal with respect to the antenna.

26. The method according to claim 21, wherein, in the preparatory calibration phase, the calibration signal is transmitted so that an angle of elevation of arrival of the calibration signal at the crossed loop antenna is substantially constant.

27. A method of monitoring used on a platform at sea or on the ground, the method comprising:
defining, at an angle of elevation substantially equal to zero, a range of bearing angles to be monitored;
if the radio signals are detected, executing the method of measuring the bearing angle of arrival θ of the radio signals according to claim 21; and
if a radio signal is detected in the monitored range of bearing angles, triggering an alert command.

28. A goniometer configured to execute the method of measuring the bearing angle of arrival θ according to claim 21.

29. A monitoring system positioned on a ship, the monitoring system configured to execute the method of monitoring according to claim 27.

* * * * *

UNITED STATES PATENT AND TRADEMARK OFFICE
CERTIFICATE OF CORRECTION

PATENT NO. : 8,674,880 B2
APPLICATION NO. : 13/128345
DATED : March 18, 2014
INVENTOR(S) : Arnaud Lecca et al.

It is certified that error appears in the above-identified patent and that said Letters Patent is hereby corrected as shown below:

Title Page:

For Item "(75) Inventors:"

Please replace the city of inventor Arnaud Lecca from "Colombes" to --Paris--.
Please replace the city of inventor Jean-Christophe Mesnage from "Colombes" to --Pontoise--.
Please replace the city of inventor Jean-Luc Rogier from "Colombes" to --Ermont--.

In the Claims:

In claim 3, column 9, line 42:

Please replace "the" before "Hermitian operator" to --a--.

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,674,880 B2
APPLICATION NO. : 13/128345
DATED : March 18, 2014
INVENTOR(S) : Lecca et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this
Twenty-ninth Day of September, 2015

Michelle K. Lee
*Director of the United States Patent and Trademark Office*